Patented Apr. 27, 1954

2,676,893

UNITED STATES PATENT OFFICE 2,676,893

WOOD-COATING COMPOSITION

Anton E. Budner, Racine, Wis., assignor to S. C. Johnson & Son, Inc., Racine, Wis.

No Drawing. Application April 21, 1951, Serial No. 222,300

12 Claims. (Cl. 106—271)

This invention relates to protective coating compositions. More specifically, it relates to liquid coating compositions for wood surfaces which are water-in-oil dispersions containing a blend of a particular wax and a specific silicone material.

It has recently been appreciated that the addition of polyorganosiloxanes to wax film-forming compositions promotes decidedly improved film characteristics. Although the polyorganosiloxane is incompatible with wax generally, when combined with it and applied to a surface by means of a mutually miscible solvent, a coating is produced which is substantially easier to buff and possesses considerably more gloss than films resulting from the application of conventional wax compositions.

I, however, found this general teaching necessary of extensive qualification before both wax and a polyorganosiloxane could be blended in a composition which was intended to be applied to wood surfaces and subsequently easily buffed to a higher luster. To promote high luster with a minimum of required buffing in the treatment of wood surfaces, I have found that it is not only necessary that a limited quantity of wax be compromised with a specific silicone (having a highly restricted viscosity range) in a mutually miscible solvent, but also, because of the inherent permeability or porosity of the wood surface, components must be included in the product to overcome the high and low gloss spots apparent on the surface and resulting from the aggregation of the silicone content.

Now, in accordance with my invention, I have developed a protective coating composition for treating wood surfaces consisting essentially of from 2.25 to 7 per cent by weight of wax, from 1.25 to 4 per cent by weight of dimethylpolysiloxane having a viscosity of from 100 to 30,000 centistokes at 25° C., from 10 to 20 per cent by weight of water consisting of droplets coated with said wax, and the major portion by weight of a liquid solvent. The solvent has an aniline point within a range of from —22° to 185° F. and is selected from the group consisting of hydrocarbons, ethers, chloro-substituted hydrocarbons and mixtures thereof.

Now, having indicated in a general way the nature and the purpose of the invention, the following examples will illustrate the invention. It is to be undertsood, however, that such examples are presented merely as illustrations of the invention, and are not to be construed as limiting the same. In the examples, the ingredients are given in parts by weight unless otherwise indicated.

Example 1

A liquid protective coating composition was produced by melting 142.5 parts of oxidized microcrystalline paraffin and 7.5 parts of microcrystalline paraffin in a suitable vessel by heating to a temperature of approximately 200° F. In a second vessel, 4250 parts of naphtha having an aniline point of from 131–137° F. was admixed at room temperature with 100 parts of bi-functional dimethylpolysiloxane having a viscosity of 500 centistokes at 25° C. Contents of the second vessel were then admixed with that of the first and the temperature of the total brought to approximately 160° F. While vigorous agitation was conducted, 500 parts of water was added at room temperature. Agitation was continued until the resulting product had a temperature of less than 85° F.

Appropriate cloths were then wetted with the product and the product thereby applied to maple and mahogany-stained wood panels which had several water-soluble or sweet spots on their surfaces. The application was made by lightly moving the cloth over the surface with the exertion of substantially no pressure upon the surface. After allowing the drying period of approximately ten minutes, a white powdery dust was evident on the surface of the panels and this dust easily wiped or buffed away, resulting in a continuous glossy and spot-free surface.

Example 2

A liquid protective coating composition was produced exactly as set forth in Example 1 and the same component parts and quantities thereof were retained, except that an additional 500 parts of the naphtha employed in Example 1 was substituted for the water disclosed in that example. The resulting product was applied to a series of panels which bore several "sweet spots" on their surfaces. A drying period of ten minutes was allowed after which time it was noted that a white wax dust appeared over the major portion of the paneled surface; however, numerous wet aggregates of oil or silcone were evident. When these panels were buffed or wiped, exactly as was done in example 1, the water-soluble stains remained evident upon the surface and high gloss streaks were obvious where the silicone had collected. Other portions of the panel had substantially less gloss than the panels treated in Example 1.

In the examples, solvents were employed which possess aniline points of from 131–137° F. However, it is to be appreciated that any liquid hydrocarbons, liquid ethers, or liquid chloro-substituted hydrocarbons, may be employed where such possess an aniline point within a range of from −22 to 185° F. Where a solvent is employed which possesses an aniline point of less than −22° F., the solvency strength of the material is too strong; hence, where the wood surface is varnish or lacquer-finished, it shall be materially damaged. In the event that a solvent having an aniline point of more than 185° F. is used, it has been found that the solvent does not possess sufficient solvency strength required by the wax. Aniline point determination was made in the conventional method prescribed by the American Society for Testing Materials.

The operable solvents may be employed singly or in combination in various and non-critical amounts with the restriction that at least a major portion by weight of the composition consist of solvent. Operable solvents include liquid hydrocarbons, such as, naphtha, Stoddard solvent, etc.; chloro-substituted hydrocarbons, such as, carbon tetrachloride, ethylene di-chloride, perchloroethylene and trichlorethylene; and ethers, as for example, ethyl, hexyl or methyl ether.

It should further be appreciated that when a petroleum distillate solvent is chosen, it is necessary that such, in addition to the aniline requirements, possess a distillation range within a range of from 190° to 450° F. Where a petroleum distillate is employed having a distillation range falling below the prescribed minimum, volatilization occurs too rapidly for most applications in allowing sufficient spreading and covering of the coating composition. If the maximum of the distillation range exceeds the prescribed maximum of 450° F., volatilization of the solvent is too slow and the retarded drying will necessitate the lapse of a prolonged period before subsequent buffing may be satisfactorily conducted. Distillation values were ascertained according to the method prescribed by the American Society for Testing Materials.

It is necessary that the wax component of the composition comprise at least 2.25 per cent but not more than 7 per cent by weight of the composition. However, the invention is without restriction as to the type of wax employed, contemplating mineral wax as a class, such, for example, as paraffin wax, which is meant to include microcrystalline and oxidized paraffins, montan wax, ozokerite and the like; vegetable wax as a class, such, for example, as carnauba wax, candelilla, ouricury, palm wax, and the like; and animal wax as a class, such, for example, as beeswax, whale wax and the like. If less than 2.25 per cent by weight of wax is employed, a substantial decrease in gloss is evident in the film, compared to the film formed by a composition including an amount within the restricted range. Furthermore, the employment of less than the prescribed minimum renders a surface which is non-uniform in gloss, bearing high and low gloss streaks. On the other hand, if the 7 per cent prescribed maximum is exceeded, difficult buffing of the applied film is obviously evident.

Liquid methyl silicones are produced in viscosities ranging from 0.5 to one million centistokes at room temperature. However, a dimethylpolysiloxane having from 100 to 30,000 centistokes at 25° C. is operable for purposes of the invention. The physical explanation of the behavior is not know, but the incorporation of a dimethylpolysiloxane having a viscosity of less than 100 centistokes results in a finish which does not possess satisfactory gloss. Material possessing a viscosity of more than 30,000 centistokes is more viscous than desired, and tends to produce a smear when the film is subsequently buffed. It has been found that generally for the most satisfactory results, the preferred range of 350 to 1000 centistokes should be observed.

Although it has not been generally appreciated in the art, dimethylpolysiloxanes are known to be of two varieties, tri-functional and bi-functional. Whereas both species are operable for purposes of this invention, I have found that the optimum results are obtained through the employment of the latter. It may be said that the qualification "bi-functional" described a silicone which has two functional groups and therefore capable of promulgating a straight chain indefinitely. For example:

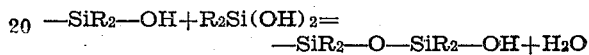

A "tri-functional" silicone may be said to be one which possesses three functional groups in its structure, hence capable of promulgating a chain and close linking it to other chains. For example:

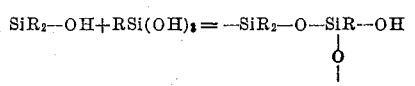

It is mandatory that this particular silicone be included in the composition in a quantity of no less than 1.25 per cent nor more than 5 per cent by weight. Less than the prescribed minimum renders a film which is decidedly difficult to buff and is non-uniform in gloss. To exceed this operable maximum would result in a surface which would bear highly objectionable smear "clouds" and streaks upon completion of the buffing operation.

The inclusion of water in the composition renders two highly desirable and necessary services. Furniture in homes and offices and other wood surfaces to which application of the compositions described herein in contemplated frequently bear undesirable spots caused by contact with organic solvent-insoluble material. The most common example of such spots are the marks left on furniture by the sticky fingers of children after eating candy or other sweets. The water therefore, when included in the composition within the restricted range, promotes a cleaning action upon the application of the composition, removing these water-soluble spots. However, the water serves an even more important function as a vehicle. The incompatibility of wax and silicone, and both for water, is well-known. Therefore, it was thought necessary that a special blend of emulsifying agents be used to render some degree of stability to the product. However, it was found that an emulsifier would minimize the amount of resultant gloss, cause a small amount of smear, and in the case of a surface which had been treated and subsequently washed off with a damp cloth, re-emulsify, leaving a highly noticeable smear. It was therefore thought necessary that the water constituent be eliminated from the potential product and the desirable cleaning characteristics foregone. However, as demonstrated in Example 2, where only solvent was used as the vehicle, the resulting wax film promoted by such a composition left noticeable aggregations of the silicone, rendering high and low gloss streaks. In conducting lengthy experiments with the constituents involved, it was discovered that if wax, certain dimethylpolysiloxanes and solvents were employed in the restricted quantities set forth above, the water reacted in a phenomonal way. The wax dispersed the water constituent into the form of droplets, completely coating each individual droplet. Thereupon, when the wax was dispersed throughout the solvent, it carried the water with it and upon application of the composition to a wood surface and the subsequent volatilization of the solvent, the water had completely distributed the wax, dispersing it uniformly among the silicone, causing the particle structure, upon drying, to be set up and disallowing the aggregating of the silicone molecules. Thus, easy buffing and wipe off and completely uniform gloss was achieved, as shown in Example 1. The undesirable effects resulting from the application of the product described in Example 2 were not evident upon metallic surfaces but unique to some wood surfaces. It is believed that such is promoted by the inherent texture of the typical wood surface which is non-uniformly porous, and permeable to certain liquid and semi-liquid substances, the alburnum wood having a substantially contrasting texture to that of the duramen.

I have found that in order to derive the two beneficial results obtained by the water as set forth above, it is necessary that it be included in the composition only within a range of from 10 to 20 per cent by weight of the composition. Where less than 10 per cent by weight is employed, the required cleaning of water-insoluble spots is not manifested. The inclusion of over 20 per cent results in a product which tends to "pack," is highly unstable, shows evidence of streaking upon application to a wood surface.

Other methods of applying the principles in the invention may be employed besides those mentioned, changes being made regarding the method or apparatus herein disclosed providing the steps or elements provided by any of the following claims be employed.

I claim:

1. A film-forming water-in-oil dispersion for treating wood surfaces consisting essentially of from 2.25 per cent to 7 per cent by weight of wax, from 1.25 per cent to 5 per cent by weight of dimethylpolysiloxane having a viscosity within a range of from 100 to 30,000 centistokes at 25° C., from 10 to 20 per cent by weight of water consisting of droplets coated with said wax and the major portion by weight of a liquid solvent having an aniline point within a range of from —22° to 185° F., a distillation range within the limits of from 190° to 450° F., and selected from the group consisting of hydrocarbons, ethers, chloro-substituted hydrocarbons and mixtures thereof.

2. A film-forming water-in-oil dispersion for treating wood surfaces consisting essentially of from 2.25 per cent to 7 per cent by weight of wax, from 1.25 per cent to 5 per cent by weight of bifunctional dimethylpolysiloxane having a viscosity within a range of from 100 to 30,000 centistokes at 25° C., from 10 to 20 per cent by weight of water consisting of droplets coated with said wax and the major portion by weight of a liquid solvent having an aniline point within a range of from 115° to 145° F., a distillation range within the limits of from 190° to 450° F., and selected from the group consisting of hydrocarbons, ethers, chloro-substituted hydrocarbons and mixtures thereof.

3. A film-forming water-in-oil dispersion for treating wood surfaces consisting essentially of from 2.25 per cent to 7 per cent by weight of wax, from 1.25 per cent to 5 per cent by weight of dimethylpolysiloxane having a viscosity within a range of from 350 to 1000 centistokes at 25° C., from 10 to 20 per cent by weight of water consisting of droplets coated with said wax and the major portion by weight of a liquid solvent having an aniline point within a range of from —22° to 185° F., a distillation range within the limits of from 190° to 450° F., and selected from the group consisting of hydrocarbons, ethers, chloro-substituted hydrocarbons and mixtures thereof.

4. A film-forming water-in-oil dispersion for treating wood surfaces consisting essentially of from 2.25 per cent to 7 per cent by weight of wax, from 1.25 per cent to 5 per cent by weight of dimethylpolysiloxane having a viscosity within a range of from 350 to 1000 centistokes at 25° C., from 10 to 20 per cent by weight of water consisting of droplets coated with said wax and the major portion by weight of a liquid solvent having an aniline point within a range of from 115° to 145° F., a distillation range within the limits of from 190° to 450° F., and selected from the group consisting of hydrocarbons, ethers, chloro-substituted hydrocarbons and mixtures thereof.

5. A film-forming water-in-oil dispersion for treating wood surfaces consisting essentially of from 2.25 per cent to 7 per cent by weight of wax, from 1.25 per cent to 5 per cent by weight of dimethylpolysiloxane having a viscosity within a range of from 100 to 30,000 centistokes at 25° C., from 10 to 20 per cent by weight of water consisting of droplets coated with said wax and the major portion by weight of a liquid hydrocarbon having an aniline point within a range of from 115° to 145° F., and having a distillation range within the limits of from 190° to 450° F.

6. A film-forming water-in-oil dispersion for treating wood surfaces consisting essentially of from 2.25 per cent to 7 per cent by weight of wax, from 1.25 per cent to 5 per cent by weight of dimethylpolysiloxane having a viscosity within a range of from 350 to 1000 centistokes at 25° C., from 10 to 20 per cent by weight of water consisting of droplets coated with said wax and the major portion by weight of a liquid hydrocarbon having an aniline point within a range of from 115° to 145° F. and having a distillation range within the limits of from 190° to 450° F.

7. A film-forming water-in-oil dispersion for treating wood surfaces consisting essentially of from 2.25 per cent to 7 per cent by weight of oxidized microcrystalline paraffin, from 1.25 per cent to 5 per cent by weight of dimethylpolysiloxane having a viscosity within a range of from 100 to 30,000 centistokes at 25° C., from 10 to 20 per cent by weight of water consisting of droplets coated with said wax and the major portion by weight of a liquid solvent having an aniline point within a range of from —22° to 185° F., a distillation range within the limits of from 190° to 450° F., and selected from the group consisting of hydrocarbons, ethers chlorosubstituted hydrocarbons and mixtures thereof.

8. A film-forming water-in-oil dispersion for treating wood surfaces consisting essentially of from 2.25 per cent to 7 per cent by weight of oxidized microcrystalline paraffin, from 1.25 per cent to 5 per cent by weight of dimethylpolysiloxane having a viscosity within a range of from 350 to 1000 centistokes at 25° C., from 10 to 20 per cent by weight of water consisting of droplets coated with said wax and the major portion by weight of a liquid hydrocarbon having an aniline point within a range of from 115° to 145° F. and having a distillation range within the limits of from 190° to 450° F.

9. A film-forming water-in-oil dispersion for treating wood surfaces consisting essentially of from 2.25 per cent to 7 per cent by weight of wax, from 1.25 per cent to 5 per cent by weight of bi-functional dimethylpolysiloxane having a viscosity within a range of from 100 to 30,000 centistokes at 25° C., from 10 to 20 per cent by weight of water consisting of droplets coated with said wax and the major portion by weight of a liquid solvent having an aniline point within a range of from −22° to 185° F., a distillation range within the limits of from 190° to 450° F., and selected from the group consisting of hydrocarbons ethers, chloro-substituted hydrocarbons and mixtures thereof.

10. A film-forming water-in-oil dispersion for treating wood surfaces consisting essentially of from 2.25 per cent to 7 per cent by weight of wax, from 1.25 per cent to 5 per cent by weight of bi-functional dimethylpolysiloxane having a viscosity within a range of from 100 to 30,000 centistokes at 25° C., from 10 to 20 per cent by weight of water consisting of droplets coated with said wax and the major portion by weight of a liquid hydrocarbon having an aniline point within a range of from 115° to 145° F. and having a distillation range within the limits of from 190° to 450° F.

11. A film-forming water-in-oil dispersion for treating wood surfaces consisting essentially of from 2.25 per cent to 7 per cent by weight of wax, from 1.25 per cent to 5 per cent by weight of bi-functional dimethylpolysiloxane having a viscosity within a range of from 350 to 1000 centistokes at 25° C., from 10 to 20 per cent by weight of water consisting of droplets coated with said wax and the major portion by weight of a liquid hydrocarbon having an aniline point within a range of from 115° to 145° F. and having a distillation range within the limits of from 190° to 450° F.

12. A film-forming water-in-oil dispersion for treating wood surfaces consisting essentially of from 2.25 per cent to 7 per cent by weight of oxidized microcrystalline paraffin, from 1.25 per cent to 5 per cent by weight of bi-functional dimethylpolysiloxane having a viscosity within a range of from 350 to 1000 centistokes at 25° C., from 10 to 20 per cent by weight of water consisting of droplets coated with said wax and the major portion by weight of a naphtha having an aniline point within a range of from 115° to 145° F. and having a distillation range within the limits of from 190° to 450° F.

References Cited in the file of this patent

UNITED STATES PATENTS

| Number | Name | Date |
|---|---|---|
| 2,258,218 | Rochaw | Oct. 7, 1941 |
| 2,382,521 | Sowa | Aug. 28, 1945 |
| 2,392,805 | Biefeld | Jan. 15, 1946 |
| 2,523,281 | Currie | Sept. 16, 1950 |
| 2,584,413 | Baer | Feb. 5, 1952 |
| 2,614,049 | Swanson | Oct. 14, 1952 |
| 2,626,870 | Cooke et al. | Jan. 27, 1953 |

OTHER REFERENCES

"Silicone News" Chemical and Engineering News, Dec. 13, 1948, page 3734.

"Silicones in Wax Polishes," Soap and Synthetic Chemicals, Dec. 1950, pages 212–215.

"The Chemistry and Technology of Waxes," Warth, Reinhold Pub. Co., N. Y., 1947, pages 454, 455.